United States Patent

[11] 3,629,062

| [72] | Inventor | Herbert O. Muenchow<br>Avon, Conn. |
|---|---|---|
| [21] | Appl. No. | 823,704 |
| [22] | Filed | May 12, 1969 |
| [45] | Patented | Dec. 21, 1971 |
| [73] | Assignee | The United States of America as represented by the United States Atomic Energy Commission |

[54] TRANSFER MACHINE FOR NUCLEAR REACTOR
3 Claims, 5 Drawing Figs.

[52] U.S. Cl. .................................................. 176/31,
214/18 N
[51] Int. Cl. ........................................ G21c 19/24
[50] Field of Search ............................... 294/86 A;
176/30, 31, 32, 87; 214/18 NR

[56] References Cited
UNITED STATES PATENTS

| 2,981,422 | 4/1961 | Bellinger et al. | 176/30 X |
| 3,232,840 | 2/1966 | Pounder et al. | 214/18 NR X |
| 3,282,335 | 11/1966 | Haller | 176/81 X |
| 3,383,286 | 5/1968 | Paget | 214/18 NR X |
| 3,483,380 | 12/1969 | Antonsen et al. | 250/108 |

FOREIGN PATENTS

| 1,375,675 | 9/1964 | France | 176/31 |

OTHER REFERENCES

McLain, Stuart, Barnes, Arthur H. Goertz, Raymond C.; 1st Nuclear Eng. and Science Congress; Problems in Nuclear Engineering; " Method of Refueling Heterogeneous Nuclear Reactors"; 1955; pp. 267, 268, 272– 274.

Primary Examiner—Carl D. Quarforth
Assistant Examiner—E. E. Lehmann
Attorney—Roland A. Anderson ABSTRACT: A fuel transfer machine for a liquid metal cooled nuclear reactor in which a retractable guide tube and telescoping lifting arm are utilized to reach down into the reactor to lift out a transfer pot containing a fuel assembly immersed in liquid metal. The machine has an independent cooling system consisting of outer fins and a closed coolant system with an immersed heat exchanger. This cooling system is intended to remove heat generated by radioactive decay in the fuel assembly during its time in the transfer machine.

INVENTOR.
HERBERT O. MUENCHOW

INVENTOR.
HERBERT O. MUENCHOW

INVENTOR.
HERBERT O. MUENCHOW 3,629,062

1

TRANSFER MACHINE FOR NUCLEAR REACTOR

BACKGROUND OF THE INVENTION

Liquid metal cooled nuclear reactors incorporating breeding show great promise of becoming economical in power production in the near future. Improvements in fuels, liquid metal technology, as well as instrumentation are all bringing costs down into competitive levels with that of nonbreeding reactors now in use, the breeding of fresh fuel being an important economic factor affecting its long term prospects.

One of the present technical difficulties involved in the operation of liquid metal cooled nuclear reactors is that of replacing fuel assemblies. Because these assemblies are hot and radioactive, requiring both continuous cooling and shielding during removal from core, the expense of providing mechanical systems to accomplish this tends to be quite high, as well as raising severe technical difficulties and problems with which must be dealt.

SUMMARY OF THE INVENTION

The present invention overcomes these difficulties by providing a relatively simple and economic arrangement for the removal and replacement of fuel assemblies while continuously providing the cooling and shielding required. In accordance with this invention, a transfer machine comprising a gripping device for the fuel assembly, a telescoping support arm, a transfer pot, and a cooling system for the latter are provided as well as provision for making a sealed entry through the top of the nuclear reactor to permit the transfer to take place. The arrangement is simple and compact, its cooling system being capable of functioning even after loss of power.

It is thus a principal object of this invention to provide apparatus for the safe and convenient removal and replacement of fuel assemblies in a liquid metal cooled nuclear reactor.

Other objects and advantages of this invention will become readily apparent from the following description of a preferred embodiment of this invention taken with reference to the accompanying drawings.

DESCRIPTION OF THE PREFERRED EMBODIMENT

Figure 1:
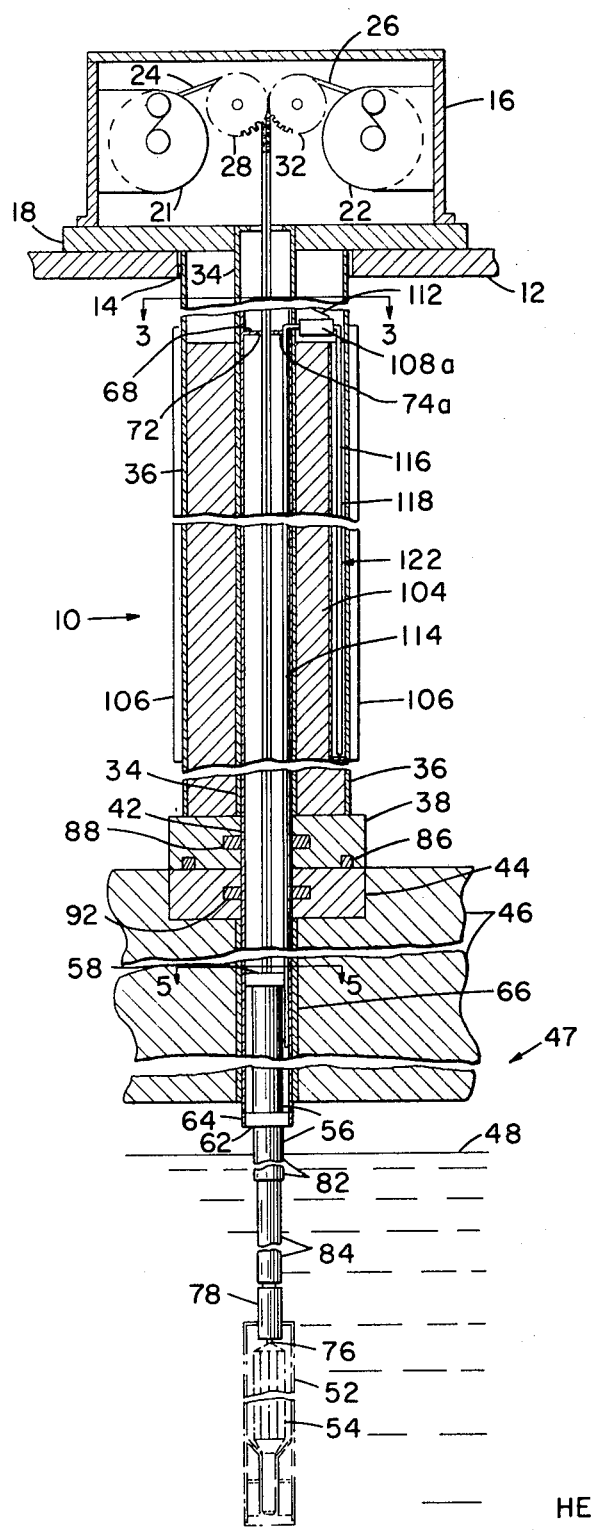
FIG. 1 is an elevation view in section of a preferred embodiment, fully extended, of this invention.

Referring to FIG. 1, transfer machine 10, which is shown in its fully extended position, is supported on a carriage 12 having an opening 14 through which machine 10 extends. The latter consists of a drive housing 16 which is supported on a plate 18 mounted on carriage 12. Within housing 16 are supported a pair of pulleys 21 and 22 which wind or unwind a pair of segmented chains, 24 and 26, respectively, over sprockets 28 and 32. Chains 24 and 26 when fed together back to back as illustrated form a stiff rod through which a push or pull motion may be transmitted. It is understood that power drives and controls for chains 24 and 26, as well as any instrumentation desired, may or may not be contained within housing 16.

Extending down through plate 18 of housing 16 is a cylindrical machine barrel 34 surrounded by a larger diameter atmospheric seal barrel 36 which terminates at its upper end against the lower surface of plate 18. Barrels 34 and 36 terminate at the bottom thereof at a seal valve 38 which contains a sealing arrangement to be described below. Valve 38 has an opening 42 whose diameter corresponds to the inside diameter of barrel 34 as shown. Seal valve 38 rests on a similarly shaped stationary seal valve 44 which is embedded within reactor shield plug 46 which forms part of the nuclear reactor containment of reactor 47. Within reactor 47, that is, beneath reactor plug 46 is found the pool of sodium 48 containing the fuel (not shown) and the immersed storage pot 52. Pot 52 is inserted into the reactor location shown as a preparatory step to refueling, as is understood in the art. When a fuel assembly is to be removed, such as assembly 54 shown within pot 52, a handling machine (not shown and not forming a part of this invention) mounted through the reactor containment raises fuel assembly 54 from the core, moves it sideways, and drops it into removal pot 52 as shown. This is accomplished without taking fuel assembly 54 out of the pool of sodium 48. Then pot 52 containing fuel assembly 54 is removed by transfer machine 10 forming this invention. The reverse process is followed when a fuel assembly is added to the reactor core.

Referring back to FIG. 1, it will be seen that the lower ends of chains 24 and 26 are attached to and support the upper end of gripper shaft 56. The upper end of the latter has a guide bushing 58 while a second guide bushing 62 is located on shaft 56 at some convenient intermediate location to maintain shaft 56 spaced from the inner wall of a cylindrical guide tube 64.

Figure 3:
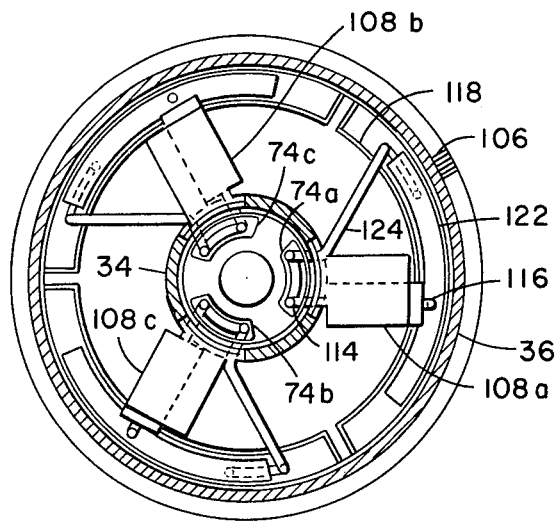
FIG. 3 is a view along 3—3 of FIG. 1.
Figure 4:
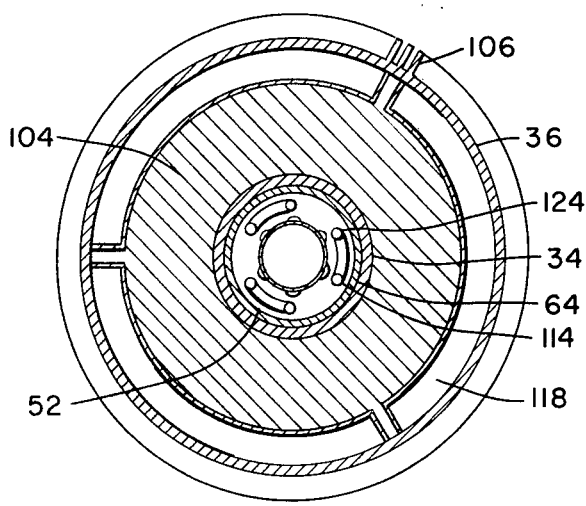
FIG. 4 is a view along 4—4 of FIG. 2.
Figure 5:
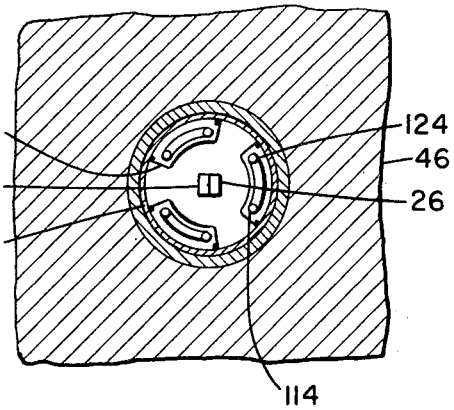
FIG. 5 is a view along 5—5 of FIG. 1.

Guide tube 64 is slidable within barrel 34, the aligned openings in seal valves 38 and 44, and a stationary tube 66 mounted in reactor plug 46 beneath stationary seal valve 44. The upper end of guide tube 64 has a cover 68 with an opening 72 to accommodate chains 24 and 26, and three annularly spaced slots 74a, 74b, and 74c, as seen best in FIG. 3, for a purpose to be later described. Guide tube 64 and gripper shaft 56 are capable of vertical movement independent of each other except that when shaft 56 is raised at some point guide bushing 58 will contact cover 68 of guide tube 64 and raise the latter. Conversely, when shaft 56 is being lowered, guide tube 64 will follow until a stop arrangement to be described later prevents further down movement of guide tube 64.

Figure 2:
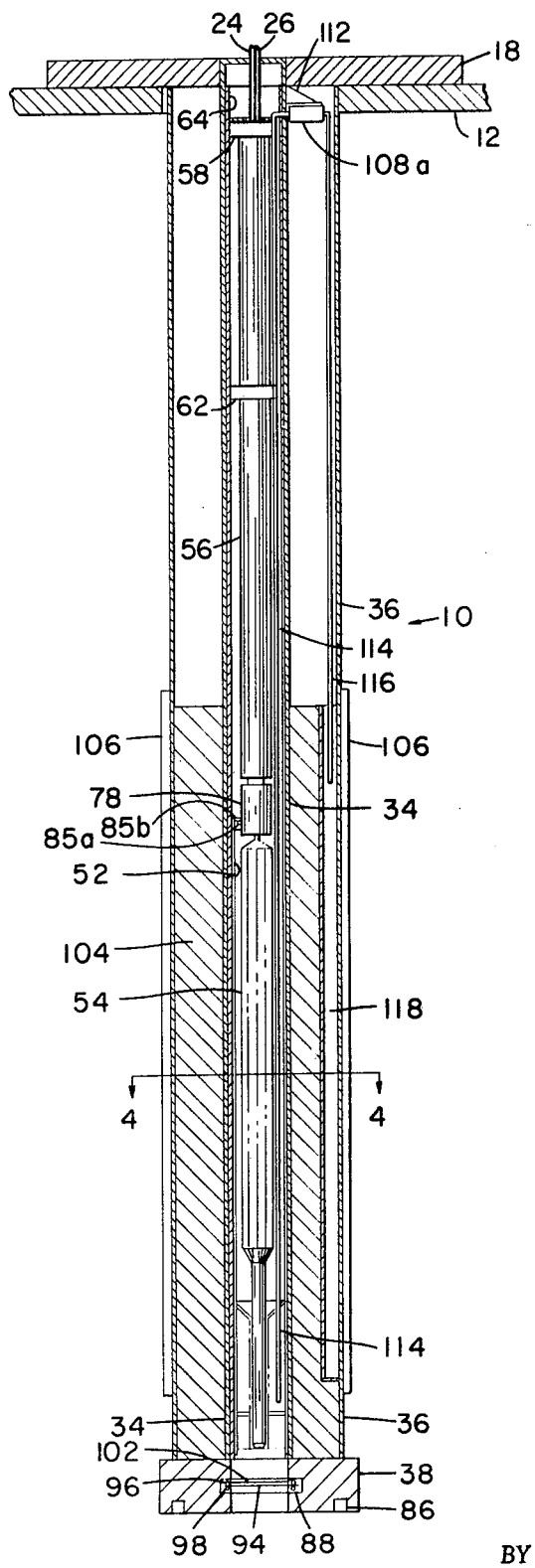
FIG. 2 is a similar view of the apparatus of FIG. 1 fully retracted.

Pot 52 is a cylindrical container open at the top and closed off at the bottom as shown so that when being raised out of sodium 48 retains sodium covering fuel assembly 54 resting therein. Each fuel assembly 54 has a fixture or handling head 76 at the top thereof for being engaged by a gripping assembly 78 mounted at the bottom of shaft 56. The latter consists of a hollow tube portion 82 extending from bushing 58 to a point below bushing 62 and a telescoping member 84 which retracts into portion 82 when gripper shaft 56 is being raised. Gripper assembly 78 is a dual head which has gripper fingers which may cam outward to connect under lifting lugs at the top of pot 52. Inward camming of these fingers lifts assembly 54 by contacting its handling head 76. Referring to FIG. 2, one of the fingers 85a is shown in the outward position and in contact with a lifting lug 85b on pot 52.

Seal valve 38 has a circular ring seal 86 which comes into contact with embedded seal valve 44 when machine 10 is lowered into place as shown in FIG. 1. Seal valves 38 and 44 are also provided with annular grooves 88 and 92, respectively, which accommodate sealing gates which are retracted after machine 10 is lowered into place so that guide tube 64 and gripper shaft 56 can be lowered through reactor plug 46. As shown in FIG. 2, the sealing arrangement for seal valve 38 consists of a sealing gate 94 mounted between rings 96 and 98. A drip pan 102 may be used above sealing plate 94 to collect sodium drippings. Sealing gate 94 and the related elements just described are retracted or inserted through an opening (not shown) passing through the side of seal valve 38.

The space between barrels 34 and 36 above valve 38 up to some convenient point is filled with lead or depleted uranium shielding 104 for limiting the escape of radiation from fuel assembly 54 in machine 10. Outer barrel 36 is provided with a large number of fins 106 for cooling purposes as will be explained further below.

The feature of prime importance of this invention is the maintenance of cooling of fuel assembly 54 during and after removal of pot 52 from the pool of sodium 48 within the reactor vessel. For this purpose there are provided three complete heat transfer loops with pump assemblies 108a, 108b, and 108c which are all identical in construction and operation. With reference to pump assembly 108a, it will be seen that it is mounted on inner barrel 34 by some convenient means such as a bracket 112. An inlet pipe 114, of a heat transfer loop, referred to as the hot leg, extends from pump assembly 108a through openings in barrel 34 and top 68 of guide tube 64 into the latter, bushings 58 and 62 having slotted portions to accommodate its passage. When pot 52 is raised into its raised position as shown in FIG. 2, the lower end of hot leg 114 extends into pot 52 down to a point near the bottom thereof. A pipe 116 of the heat transfer loop extends down from pump assembly 108a into an annular pot 118 provided on the outside perimeter of the shielding 104 just inside of barrel 36. Pot 118 is filled with a suitable coolant such as NaK in contact with barrel 36. Immersed in the NaK coolant is a heat exchanger 122 (see FIG. 3) of conventional design attached to the lower end of pipe 116 (and an integral part thereof) through which the hot sodium passes and then leaves by way of a return pipe or cold leg 124 of the heat transfer loop. Within pot 118 the NaK coolant circulates by convection, as is understood in the art, transferring heat from heat exchanger 122 to fins 106. The closed heat transfer loop comprising legs or pipes 114, 116, 124 and pump 108a is designed so that in the event of power failure natural circulation of coolant will occur through the arrangement just described to transfer heat to heat exchanger 122. The heat transfer system for each of pump assemblies 108a, 108b, and 108c is identical, and each is sized so that natural circulation within them will maintain temperatures with fuel assembly 54 below the maximum permissible temperature indefinitely.

While fuel assembly 54 is within pot 52 in pool of sodium 48, the latter serves as the heat removal system and fuel assembly 54 remains unaffected by a machine power failure. As machine 10 pulls transfer pot 52 with assembly 54 into guide tube 64, hot and cold legs 114 and 124 slip into the top of the open pot 52 and into the contained sodium. With a power failure at this point, the heat load is split between the machine's heat transfer system and sodium 48 which still surrounds that portion of pot 52 still partially immersed.

In the operation of the apparatus described, the nuclear reactor plant would be provided with three transfer points along the same axis. With guide tube 64 and shaft 56 fully retracted, carriage 12 would be movable along the axis of the transfer points. At each transfer point would be provided a valve seal 44 closed off in the manner described as to seal valve 38. In this way machine 10 can be moved remotely to any desired station to remove or replace a fuel assembly.

It is thus seen that there has been provided a relatively simple yet reliable transfer machine for a nuclear reactor having a movable closed loop heat transfer system which allows heat transfer without violating shielding or atmospheric containment. While only a preferred embodiment has been described it is understood that many variations thereof are possible without departing from the principles of this invention as defined in the following claims.

I claim:

1. A fuel assembly transfer machine in combination with a liquid metal cooled reactor having a transfer pot containing a fuel assembly therein, said transfer port immersed in said liquid metal below an entrance port, said machine comprising:
   a. control and drive assembly means positionable above and spaced from said entrance port;
   b. a tubular barrel extending down from said assembly means;
   c. seal valve means attached to the bottom of said barrel for making sealed communication with said entrance port, said communication extending into said barrel;
   d. slidable guide tube means within said barrel for sliding through said entrance port into said reactor;
   e. telescopic shaft means movable in said guide tube means for being lowered and extended down through said guide tube means for engaging said transfer pot;
   f. means extending from within said assembly means through said guide means for raising and lowering said telescopic shaft means; and
   g. heat transfer means for communicating with liquid metal trapped within said pot as the latter is lifted into said barrel above said seal valve means for removing heat therefrom and maintaining safe temperatures within said transfer pot consisting of (1) an atmospheric seal barrel surrounding and spaced from said tubular barrel, (2) colling fins on the outside of said seal barrel, (3) a trapped body of coolant in the annular space between said barrels to transfer heat to said cooling fins through the wall of said seal barrel, (4) a heat exchanger immersed within said trapped body of coolant, and (5) means for circulating liquid metal from said pot through said heat exchanger for the rejection of heat from said pot to said coolant and said cooling fins.

2. The transfer machine of claim 1 in which said seal valve means contains a retractable seal for closing off the bottom opening of said seal valve means when said guide tube means and telescoping shaft means are retracted, thereby permitting movement of said transfer machine to another location.

3. The transfer machine of claim 2 in which said circulating means includes a pump mounted on said tubular barrel having an inlet pipe extending into and down said tubular barrel terminating above the bottom of said guide tube means, said inlet pipe slipping into said pot and communicating with the liquid metal contained therein as the pot is lifted.

* * * * *